Dec. 20, 1949 M. DEBREY 2,491,802
VOLTAGE REGULATOR SYSTEM
Filed Oct. 28, 1946 2 Sheets-Sheet 1
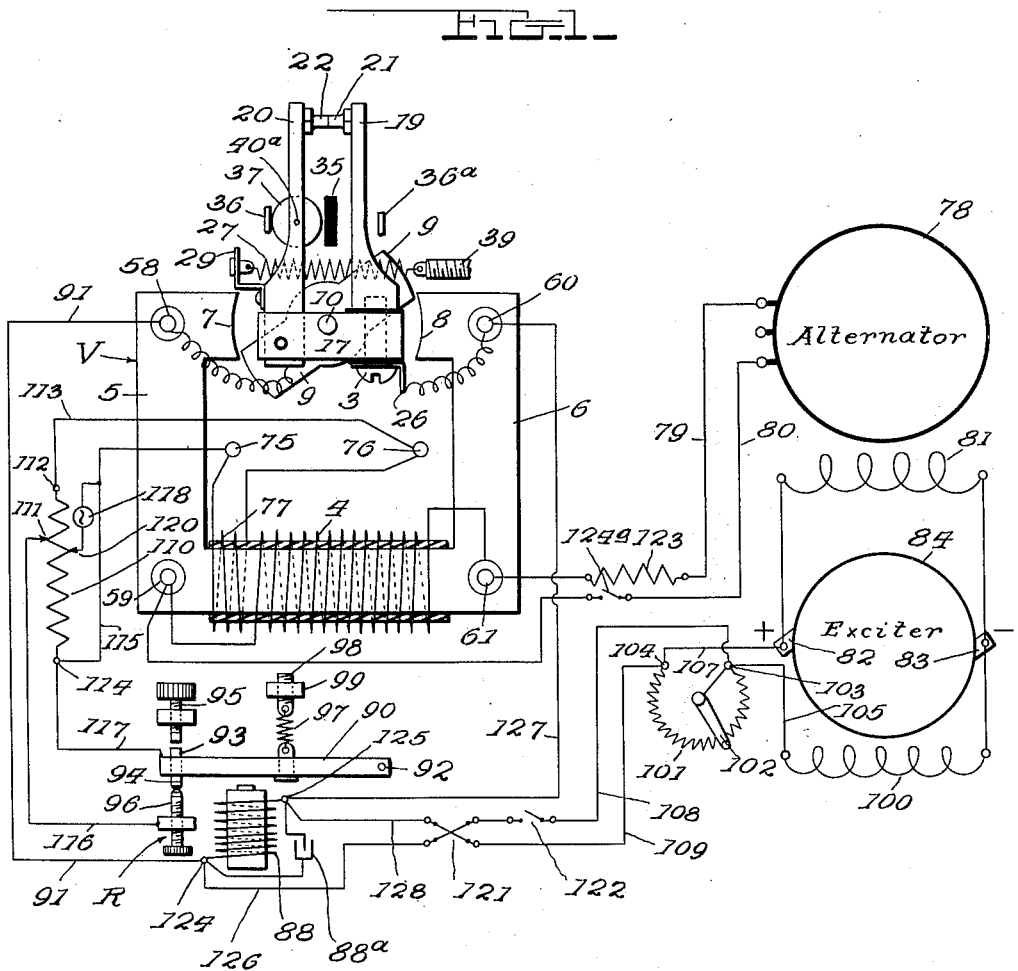
Inventor
Michael Debrey
By H. B. Willson & Co.
Attorney

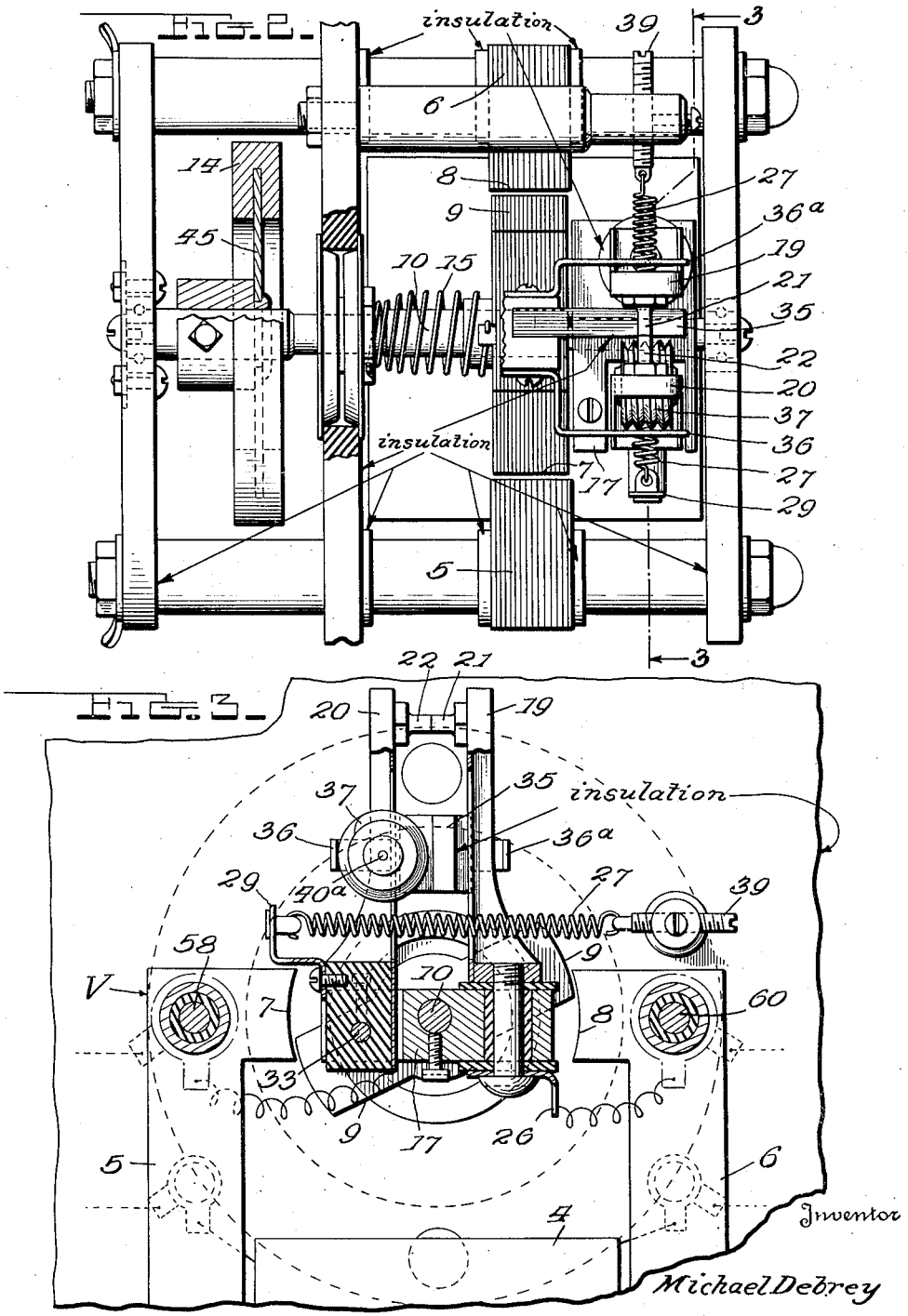

Patented Dec. 20, 1949

2,491,802

UNITED STATES PATENT OFFICE 2,491,802

VOLTAGE REGULATOR SYSTEM

Michael Debrey, East Moline, Ill.

Application October 28, 1946, Serial No. 706,131

3 Claims. (Cl. 322—28)

My invention relates to the regulation of the output voltage of alternators, and in particular to a system employing a vibrating switch element which vibrates at a frequency materially below the synchronous frequency of the alternator.

In the prior art, in such regulating systems, the vibrating switch elements have been arranged to vibrate at the synchronous frequency of the alternator, and at such a high frequency there is a definite limit as to the size of alternator which can be so regulated. In such a regulator operating synchronously, as a practical matter, the control current broken by the vibrator contacts cannot exceed about one ampere without seriously damaging the contacts, and this corresponds to a comparatively small alternator, certainly not greater than 100 kw.

An object of my invention is to provide a voltage regulating system which is suitable for regulating alternators of relatively large size.

Another object of my invention is to provide a voltage regulating system employing a non-synchronous electromagnetic vibrator which vibrates relatively slowly, of the order of 200 to 500 vibrations per minute.

A further object of my invention is to provide a voltage regulating system capable of handling currents of substantial value.

Still another object of my invention is to avoid the burning of vibrator contacts in a voltage regulating system handling relatively large currents.

My invention will be better understood by reference to the following specification and the appended drawings wherein—

Fig. 1 is a circuit diagram of my regulating system showing the circuit connections of the several elements, Fig. 2 is a top plan view of the vibrating switch unit with parts in section, and Fig. 3 is a front elevation of the vibrating switch unit, with parts in section, taken on the line 3—3 of Fig. 2.

In the low speed non-synchronous vibrator switch which I employ, the slow operation permits the contacts to become separated by an appreciable space, of the order of 0.02 inch or more, whereas in the synchronous vibrators operating at perhaps 7200 vibrations per minute, the spacing between the contacts is often as small as 0.001 inch, which will arc badly even on small values of current. In my system, the non-synchronous vibrator is provided with a supplementary damping winding and a ballast wheel, and is used in a circuit with a relay in such a way as to greatly improve the regulating action.

Referring to the drawings in detail, in Fig. 1, the alternator 78 has output connections 79, 80, and a field winding 81. The alternator may be a polyphase alternator, of which 79 and 80 are the terminals of one phase.

A direct current exciter 84 delivers its output to the field of the alternator 78, and the exciter has its own field winding 100. The exciter is self-excited, but a rheostat 101 is connected in series with the exciter field. Provision is made for intermittently short circuiting the terminals of rheostat 101 in a manner hereafter described, for the purpose of integratingly increasing the current passing through the exciter field and thereby raising the alternator output voltage when it requires such regulation.

The vibrating switch element V is shown in detail in Figs. 2 and 3, and is more particularly described in my copending application Serial No. 703,409, filed October 15, 1946, now Patent No. 2,484,934, issued October 18, 1949.

The vibrating switch element V comprises a magnetic frame 5, 6 which may be made in two pieces for convenience, in magnetic relation. A principal actuating winding 4 is wound on laminated magnetic frame 5, 6, and is connected to the output terminals of alternator 78 through binding posts 59, 61, resistance 123, switch 124a, and leads 79, 80. Rotatably mounted in a gap in magnetic frame 5, 6, is an armature 9 which is urged by an adjustable spring 15 out of the position of minimum reluctance which would be, to most closely line up with or approach engagement with pole faces 7, 8, of frame 5, 6. A ballast wheel 14 having a web 45 is mounted on the shaft 10 which fixedly carries armature 9 and materially increases the mechanical inertia of the vibrator unit and makes it impossible for it to have a natural frequency of vibration anywhere near as high as 7200 per minute.

Fixedly carried on shaft 10 is also a block 17 which fixedly carries in insulating relation an arm or finger 19, and by a pivot 33 carries in pivotal and insulating relation another arm or finger 20. A bumper roller 37 is pivotally carried by a pivot 40a on arm 20. A stop block 35 of insulating material is mounted on the frame and supported between arms 19 and 20 and is positioned to be engaged by bumper roller 37 to cause relative separation of arms 19 and 20 and the terminal contacts 21 and 22 respectively carried thereby when armature 9 rotates block 17. Arms 19 and 20 and their contacts are respectively connected to binding posts 60 and 58. A helical spring 27 is connected to bracket 29 carried by arm 20, and is fastened at its other end to adjustable screw 30, to adjust the force with which arm 20 is resiliently urged toward engagement with arm 19, which thereby adjusts the speed of vibration of shaft 10 and the parts it carries. Bumper roller 37 preferably has a threaded or grooved surface to prevent it from sticking to stop 35 if there is an accumulation of oil on these parts. It will be noted that pivot 33 is offset substantially with reference to the axis of shaft 10, which gives arm 20 a sliding motion with reference to arm 19 when shaft 10 rotates. Adjacent the outer sides of arms 19 and 20 are positioned respectively flat spring blades 36 and 36a which yieldably hold roller 37 and arm 19 respectively if unusually powerful impulse is given to shaft 10, as by a sudden overload, and in such cases, the spring blade serves to hold the contacts engaged. The particular structure described of roller 37 and stop 35 and related parts serves to produce a sudden and substantially spaced separation of contacts 21 and 22 when shaft 10 is rotated, and not simply a rubbing contact.

A supplementary damping winding 77 is also wound on magnetic frame 5, 6, and may be wound in superposed relation over principal winding 4. This supplementary winding 77 is intermittently short-circuited in a manner below described and thereby varies the equivalent magnetic reluctance of the frame 5, 6. Supplementary winding 77 is connected to terminals 75, 76, which in turn by wires 115, 113 are connected to the terminals 114, 112 of a resistor 110 adjustably tapped at 111. A signal lamp 118 is connected from a tap on resistor 110 to connection 115 and serves to indicate by its flickering whether the vibrator is operating properly.

A relay R having an actuating winding 88 has an armature 90 pivotally mounted at 92, carrying terminal contacts 93, 94, and also has fixed but adjustable contact 96 engageable with movable contact 94 when the winding 88 is energized, and also has stop 95 to restrain the upward motion of armature 90 when urged upward by spring 97 when winding 88 is deenergized. A condenser 88a may be connected across winding 88 to reduce surges, and undue sparking between contacts 21 and 22. Movable contact 94 and fixed contact 96 are respectively connected by wires 117 and 116 to terminal 114 and tap 111 of resistor 110, so that the lower portion of resistor 110 is shorted out of the circuit when winding 88 is energized and armature 90 is pulled down, thus resulting in decreasing the short circuit resistance of supplementary winding 77 and thereby changing the equivalent magnetic reluctance of frame 5, 6.

Binding posts 59 and 60 are respectively connected by wires 91 and 127 to terminals 124 and 125 to which are connected through wires 126 and 128, double-pole, double-throw switch 121, switch 122, and wires 108—109, the terminals 104, 103 of field resistor 101. Hence, when contacts 21 and 22 are closed, winding 88 of relay R is short circuited, and field resistor 101 is short circuited and the field current of exciter 84 is increased, and thereby the output voltage of alternator 78 is increased.

I have found that the system employing the several pieces of apparatus and the connections which I have described, give much improved operation over the arrangements of the prior art, regardless of what may be the actual manner in which the instantaneous values of voltage and current operate on the different parts of the apparatus. I will describe what I believe to be the manner of operation, without, however, limiting my invention thereby.

The voltage of alternator 78 applied to winding 4 tends to cause rotation of armature 9, and such rotation occurs at a frequency determined by the mechanical characteristics of the system including ballast wheel 14 and the value of the shunt resistance across the terminals of supplementary winding 77.

The output D. C. voltage of exciter 84 depends on the average value of the exciter field current in its field 100 over a short period of time as a second, and this average value depends on the total part of an interval as one second during which rheostat 101 is short circuited by closing of contacts 21, 22.

The various pieces of apparatus as rheostats 101 and 110, springs 15 and 27, are adjusted so that as armature 9 vibrates, it maintains the alternator output voltage at a desired value. As above stated, the parts are adjusted to have armature 9 vibrate from about 200 to 500 times a minute.

If adjustable tap 111 is moved upward, or if spring 27 is tightened, the vibration rate of armature 9 is increased. If tap 111 is moved downward or if spring 27 is loosened, the vibration rate of armature 9 is decreased. Spring 97 is normally set to keep armature 90 up under normal operating conditions.

If after proper adjustments are made, the alternator output voltage increases a little, due perhaps to a little decrease in the load, the increased voltage applied to winding 4 tends to pull armature 9 farther and more strongly into line with pole pieces 7, 8, and this tends to keep contacts 21, 22, separated a greater total portion of an interval such as a second, and this decreases the average current through winding 100 and, therefore, reduces the alternator output voltage a little.

At the same time, every time that the contacts 21, 22, are closed, they short circuit actuating winding 88 of relay R and armature 90 is pulled up and opens the short circuit across the lower part of resistor 110, which increases the resistance across supplementary winding 77. This changes the magnetic reluctance of the magnetic circuit of frame 5, 6, and its integrated value over a short interval as a second, and tends to affect the position of armature 9. When contacts 21, 22, are open, the short circuit is removed from winding 88 and armature 90 is pulled down to close contacts 94, 96, which short circuits the lower part of resistor 110 and thereby decreases the resistance across supplementary winding 77 and its integrated value over a short interval as a second, and varies the magnetic reluctance of the magnetic circuit of frame 5, 6, in the opposite direction.

If the alternator output voltage drops a little due perhaps to an increased load, the decreased voltage on winding 4 tends to permit armature 9 to be retained in a position farther out of line with pole pieces 7, 8, and this keeps contacts 21, 22, closed a larger total fractional part of a second. This tends to raise the average value of the exciter field current and thereby to raise the alternator output voltage. At the same time, the winding 88 of relay R is short circuited while contacts 21, 22, are closed, which releases armature 90 and opens the short circuit across the lower part of resistor 110, and hence varies the equivalent magnetic reluctance which supplementary winding 77 applies to magnetic circuit 5, 6, both instantaneously and integrated over a second, and hence tends to vary the position of armature 9.

The combined effect of supplementary winding 77 with the various other parts of the apparatus as described, is found to give substantial improvement in the quality of regulation obtained, and the value of the current which can be handled by contacts 21, 22, without damage thereto, and the size of alternator which can be satisfactorily regulated by such a vibrating regulator.

It will be apparent that I have provided a voltage regulator of simplified construction which is adapted to facilitate processes of production, and to regulate more efficiently alternators of larger size than it has been heretofore possible to regulate with vibrating regulators. It is to be noted that I am able to effect regulation of alternators up to 200 kw. by the use of only two electromagnetic switches or relays and only two pairs of contacts, and that the contacts 21 and 22 of the vibratory switch V not only short circuit the exciter field rheostat 101 but also the relay coil 88 which receives the voltage that exists across the terminals of rheostat 101 at the moment contacts 21 and 22 separate. The relay R being thus energized short circuits the register 110 from the circuit of coil 77 thus affecting the operation of the vibrating switch carrying the contacts 21 and 22. The few parts and simple connections make the regulator comparatively inexpensive to produce and to maintain in operation.

I claim:

1. An improvement in a voltage regulating system of the type embodying an alternator, an exciter, and two electromagnetic switches one of which said electromagnetic switches controls the excitation winding of the other of said electromagnetic switches, and the last mentioned electromagnetic switch controls an auxiliary winding on said first-mentioned switch, said improvement consisting in providing said first-mentioned switch with a pair of vibrating switch contacts, connections for connecting an actuating winding of said last-mentioned switch in parallel with a rheostat in the field of said exciter and across said vibrating switch contacts, mounting means for mounting said vibrating switch contacts for small relative displacements, said first-mentioned electromagnetic switch including a principal actuating winding adapted to cause rapid relative movement of said vibrating switch contacts, means for normally urging said vibrating switch contacts into engagement, and further including an auxiliary actuating winding wound electromagnetically similarly to said principal winding and having a tapped resistor connected across itself, connections respectively between a tap of said resistor and one terminal of said resistor for connecting the same across contacts of said last-mentioned switch which are closed when its winding is actuated, connections between said principal actuating winging of said first-mentioned switch and the output terminals of the alternator, whereby variations in the output voltage of said alternator cause compensating variations in the field current of the exciter to regulate the output voltage of the alternator since said vibrating switch contacts are the only contacts employed to control the exciter without controlling said last-mentioned electromagnetic switch.

2. A system according to claim 1, said first-mentioned switch comprising a magnetic frame whereon said principal actuating winding and said auxiliary actuating winding is wound, and said first-mentioned switch being so arranged that said vibrating switch contacts separate when the voltage applied to said principal winding increases substantially.

3. A system according to claim 1, said first-mentioned switch comprising a rotatably mounted armature and a magnetic frame wherein said armature is mounted in magnetic relation, and mechanical inertia means mounted in mechanical relation to said armature for reducing the natural frequency of vibration thereof substantially below the synchronous frequency of said alternator, said vibrating switch contacts being mounted for relative displacement by movements of said armature.

MICHAEL DEBREY.

REFERENCES CITED

The following references are of record in the file of this patent:

UNITED STATES PATENTS

| Number | Name | Date |
|---|---|---|
| 1,705,675 | Paech | Mar. 19, 1929 |
| 1,830,975 | Ashbaugh et al. | Nov. 10, 1931 |
| 1,989,084 | Debrey | Jan. 29, 1935 |